United States Patent [19]

Fessler

[11] 4,030,838

[45] June 21, 1977

[54] PHOTOMETER MODE INDICATOR

[75] Inventor: Jon Leroy Fessler, Tigard, Oreg.

[73] Assignee: Tektronix, Inc., Beaverton, Oreg.

[22] Filed: Mar. 1, 1976

[21] Appl. No.: 662,650

Related U.S. Application Data

[63] Continuation of Ser. No. 519,366, Oct. 30, 1974, abandoned.

[52] U.S. Cl. .............................. 356/219; 354/23 D; 356/227
[51] Int. Cl.² ......................................... G01J 1/42
[58] Field of Search .......... 356/219, 218, 227, 233; 354/23 R, 23 D, 53–56, 60 R, 60 E, 60 L

[56] References Cited

UNITED STATES PATENTS 3,591,297 7/1971 Hagner .............................. 356/219
3,724,343 4/1973 Lancor, Jr. et al. ........... 356/219 X Primary Examiner—Eugene R. LaRoche
Attorney, Agent, or Firm—Kenneth M. Durk

[57] ABSTRACT

An apparatus for facilitating the measurement of light parameters such as intensity of light when using a digital photometer or similar device whose readout incorporates a hold or memory function. The apparatus includes a photoelectric sensor receiving light to be measured, in conjunction with an optical view system, in a small acceptance angle and a light source providing an indication, in conjunction with the same optical view system, of the hold mode and means for visually connecting the measurement hold mode and the sensed light parameters together. Means are also provided for initiating the measurement.

4 Claims, 6 Drawing Figures

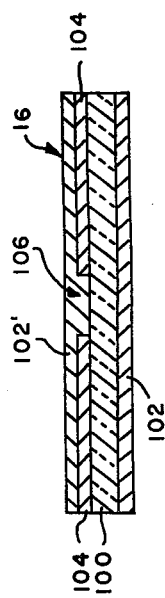
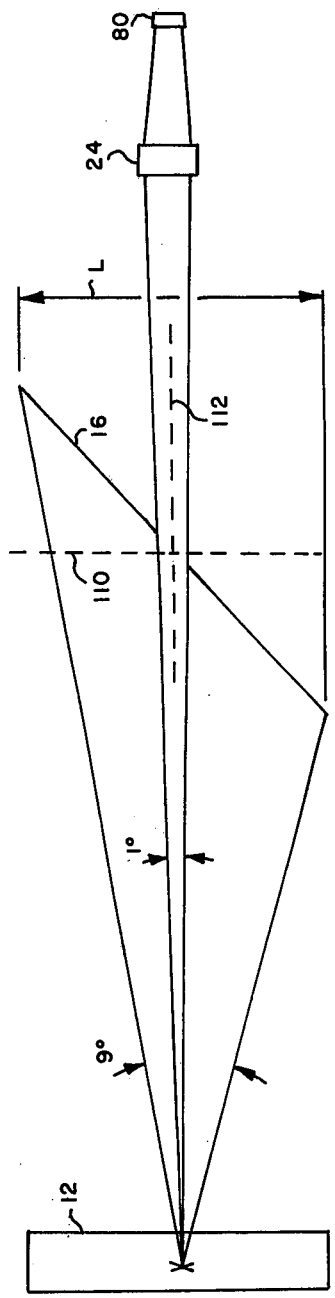
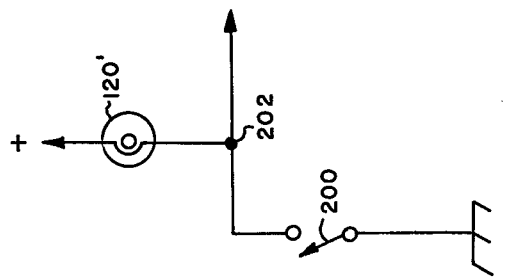

PHOTOMETER MODE INDICATOR

This is a continuation of application Ser. No. 519,366 filed Oct. 30, 1974, now abandoned.

BACKGROUND OF THE INVENTION

The use of an apparatus or similar device to measure light intensity or other light parameters, and then display the results of such measurements in digital form are well known in the fields of illumination engineering, radiometry and photometry. In most applications, the measurement is evaluating a centrally located portion of the center of interest of a scene and knowing the exact moment that readout of the device has held or memorized. The prior art has not provided, therefore, an apparatus or similar device which simultaneously enables an operator to view the centrally located portion of the center of interest of ascene and make a light measurement thereof without the possibility of moving off the scene to view the readout. This becomes significant when, say, a 1 degree acceptance angle luminance probe is being used as the electro-optical head for a digital photometer.

SUMMARY OF THE INVENTION

The present invention overcomes the disadvantages described above for the prior art in that what is provided is an apparatus for facillitating the measurement of light parameters which allows an operator to know exactly what is being measured at the time of measurement without the possibility of moving off the scene to view the readout.

Basically, a photoelectric sensor receives light to be measured, in conjunction with an optical view system, in a small acceptance angle. A light source provides an indication, in conjunction with the same optical view system, in the actual measurement area of the status of the hold circuitry. Means are provided for initiating the measurement.

It is therefore an object of the present invention to provide an apparatus for facilitating the measurement of light.

It is another object of the present invention to provide an apparatus for facilitating the measurement of light when using a digital photometer or similar device whose readout incorporate a memory of hold function.

It is yet another object of the present invention to provide an apparatus for facilitating the measurement of light to overcome the disadvantages of the prior art.

The foregoing and numerous other objects, advantages, and inherent functions of the present invention will become apparent as the same is more fully understood from the following description, which describes the present invention; it is to be understood, however, that these embodiments are not intended to be exhausting in order that others skilled in the art may fully understand the invention and principles thereof and the manner of applying it in practical use so that they may modify it in various forms, each as may best be suited to the conditions of the particular use.

DESCRIPTION OF DRAWINGS

In the drawings:

FIG. 2 including FIGS. 2A and 2B, is a diagrammatic view, in side elevation, of the components of the instrument according to the present invention;

FIG. 3 including FIG. 4 is a schematic diagram of the measurement hold or storing initiating means according to the present invention.

DESCRIPTION OF INVENTION

Figure 1:
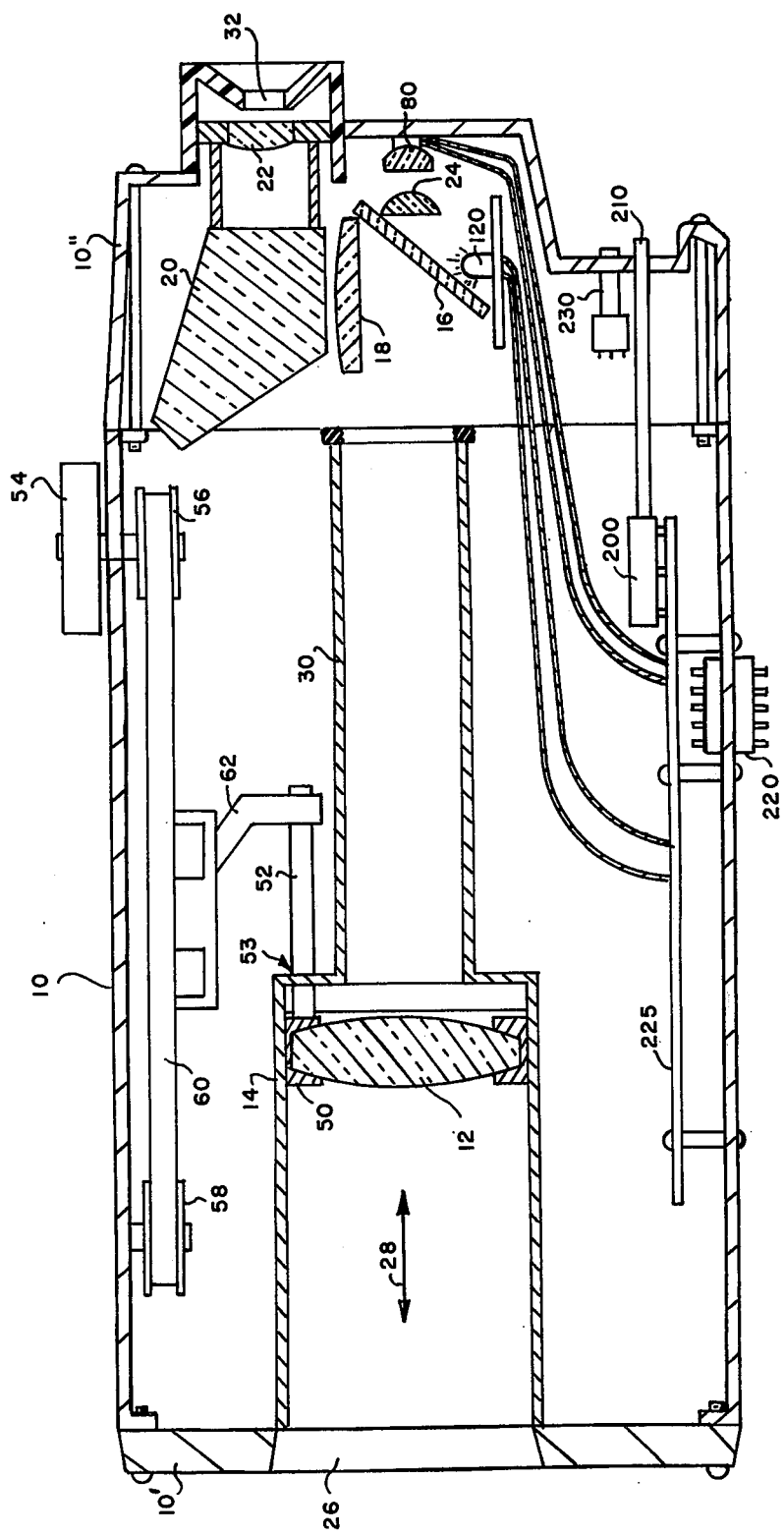
FIG. 1 is a longitudinal section through an instrument according to the present invention.

Referring now to the drawings and in particular FIG. 1, there is shown a longitudinal section through an instrument according to the present invention. A casing 10 having removable end portions 10 ' and 10" encloses an optical viewing system for viewing an external scene, system comprising an objective lens 12 adjustably mounted within a housing 14, a mirror 16, a field lens 18, a prism member 20, and eyepiece lens 22. An additional lens 24, the purpose of which will be described later in the description, is also provided. The optical viewing system receives light from an external scene via an aperture 26 provided in end portion 10' of casing 10. This light is focused upon mirror 16 by moving the adjustably mounted objective lens 12 in the direction of double headed arrow 28. Housing 14 as well as an additional housing 30 confines the light from the external scene for purposes well known. The focused light on mirror 16 is gathered from the mirror by field lens 18 and passes it to prism 20. In the preferred embodiment, prism 20 is preferably a penta-roof prism so that a viewer of the scene, observing through eyepiece portion 32 provided in end portion 10", "sees" the scene via eyepiece lens 22 in a normal manner, i.e. there is no left to right image reversal or upside-down image.

To focus the light from an external scene, objective lens 12 is mounted within housing 14 by a securing member 50 such as plastic. The securing member, in turn, is fastened to a guide arm 52 which passes through a sealed aperture portion 53 in the housing 14. Securing member 50 has dimensions slightly less than the dimension of housing 14 and as such is capable of movement within the housing in the direction of double headed arrow 28 in accordance with the position of guide arm 52. A viewer focus mechanism comprising a focus knob 54, drive pully 56, idler pulley 58, drive means 60, and connection member 62 is provided so that the viewer of an external scene can position objective lens 12 in the direction of double headed arrow 28 to focus the light on mirror 16. As can be discerned from the drawing, rotation of focus knob 54 rotates drive pully 56 operably attached thereto. Drive means 60 which, for example, can be a continuous belt etc., connected to drive pully 56 and idler pulley 58 is thus caused to move in response to the rotation of the focus knob 54. The connection member 62, which is carried by drive means 60 and attached to one end of guide rod 52 moves the objective lens 12 in the direction of double headed arrow 28 to focus the light from the external scene on the mirror 16.

The focused light from an external scene onto mirror 16 is also coupled, in small acceptance angle, to a photoelectric sensor 80 via the already mentioned lens 24, which collects light from the mirror and directs it to the sensor. Photoelectric sensor 80 can be a photo diode (preferred), photomultiplier, phototransducer or other suitable device which converts light into an equivalent electron flow. It has previously been mentioned that the photoelectric sensor receives light from the image (focused) in a small acceptance angle. This accomplishment is best understood with reference to FIG. 2. In FIG. 2A there is shown, in side elevation, the objective lens 12, mirror 16, additional lens 24 and photoelectric sensor 80. Light from the external scene passing through central point X of objective lens 12 is applied to mirror 16 dependent upon the length L of mirror 16 and has a focus plane indicated by the dashed line 110. In the preferred embodiment, light passing through point X will be mirrored if such light passing through point X is within a 9° angle as shown. Referring now to FIG. 2B, mirror 16 defines a glass substrate portion 100 having an anti-reflection coating 102 such as magnesium fluoride on one surface thereof. The opposite surface of substrate portion 100 having a coating of reflecting material 104, such as aluminum. This entire surface of the substrate is coated with such reflecting coating except for a central portion 106 defining an aperture of ellipsoidal shape. The reflecting material as well as substrate 100 directly below aperature 106 has deposited thereon a coating of antireflection material 102'. It should be noted that the coatings 102 and 102' need not be used, however, an approximate loss of light on an air to glass surface of 4% results whereas the approximate loss of light on a magnesium to glass surface is only 1%. Mirror 16 is then mounted within casing 10 at an angle to supplement the ellipsoid aperature, i.e. if aperature 106 is a 45° ellipsoid and lens 16 is mounted at 45° relative to objective lens 12, the focal point to which the light from an external scene is directed appears as a full circle. As can be discerned, the area of the aperature 106 determines the acceptance angle of light which is passed to the photoelectric sensor. Additionally, the shape of the aperature is determined by the type of sensor used. In the preferred embodiment of the present invention, photoelectric sensor 80 has been indicated to be a photodiode; such diode having a light reception area defining a circle. Hence aperature 106 provides the desired characteristics to match the sensor geometry. Additionally, the area of aperature 106 in the preferred embodiment allows only 1 degree cone of the light passing through point X to reach the sensor.

Returning to FIG. 1, a light source 120 is disposed in alignment with the aperature of mirror 16. The light source may be a light emitting diode (LED) or suitable means for providing light rays in the spectrum having a wavelength of 400–700 nanometers (visual spectrum). Field lens 18 is disposed between the mirror 16 and prism 20 to gather mirrored light and light from the light source 120 so that the plane of focus is rotated 90° and lies along the dashed line 112 of FIG. 2A. Light which is gathered via the field lens is reflected by prism 20 so that it is visable to the viewer of an external scene via eyepiece lens 22 to eyepiece portion 32.

Figures 3A, 3B:
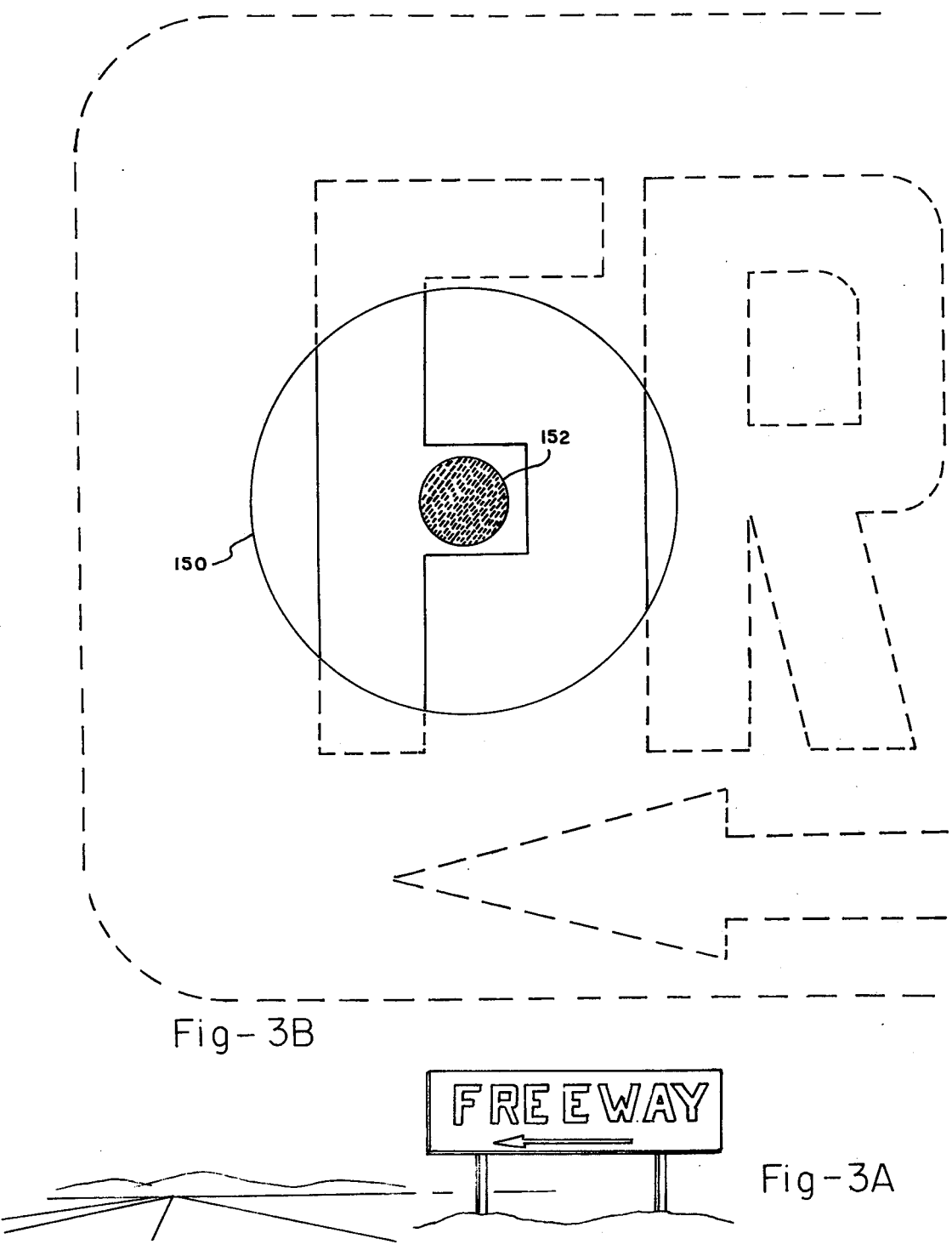
FIGS. 3A and 3B, illustrates a typical image of the scene to be measured as seen in the view finder.

Referring now to FIG. 3, there is illustrated a typical image of the scene to be measured as seen through the eyepiece portion 32 hereinafter referred to as viewfinder 32. (The scene, see FIG. 3A, is a typical view of a "road".) The outer circle 150 of FIG. 3B defines the maximum range of view as seen in the view finder when the "sign" is viewed from an appropriate distance. Located directly in the center of the range of view is a dark area circle portion 152 which represents the actual area of the scene to be measured; i.e., the 1° area of light passing through the aperature in mirror 16. Although "F" is shown in the drawing, in actual practice a portion of "F" would not be mirrored as it is the area to be measured. What is seen, however, is either a dark spot or the light source and is an object of the invention. When light source 120 is emitting light, area 152 becomes illustrated to precisely allow an operator to know exactly that the digital circuitry is in a hold or memory mode. This light source does in no way illuminate the scene being measured. Thus, there is provided a means for visually connecting the exact point in time the instrument goes into the hold memory mode and what the optical system was aimed at, at that instant. In the preferred embodiment of the present invention, light source 120 is a source of visible light such as for example, a colored light which is the preferred embodiment for reasons deemed obvious.

The operation of the above described means can be best understood with reference to FIG. 4 which is the basic schematic diagram of the measurement hold initiating means. A switch means 200 is connected in series with the light source 120' and this series combination is connected between a pair of suitable sources of electrical potential such as + and ground, respectively. With switch 200 in an open position, light source 120' is inoperative. In this mode of operation, an operator would view the scene to be measured as previously described. With switch 200 in a closed position, light source 120' becomes operative. The area of the scene to be measured thus becomes a "bright spot" indicating to the operator that the unit is in hold memory. Additionally, at a junction 202 located between series connected switch 200 and light source 120', a control level is develped which can be used to initiate the actual measurement hold. Thus, the operator knows exactly what is being held or memorized and exactly when the measurement hold was made, a vast improvement over prior art.

So that an operator of the above described device can maintain visual contact with the measured scene as well as the time the measurement hold is made, switch 200 is conveniently located mounted within the casing 10 and is provided with an activator arm 210 which protrudes through an opening provided in casing 10". The input and output connections between the apparatus of the subject invention and the indicating device are provided through a connector 220, which, in turn is connected to the switch 200' and light source 120 via conventional circuits mounted upon a circuit board 225 located within the casing 10. The conventional circuits are commonly referred to as standardizing compensating sensor amplifiers and in conjunction with the control 230 allows the apparatus to be standardized to any measurement indicator.

While there has been shown and described the preferred embodiment of the present invention, it will be apparent to those skilled in the art that many changes and modifications may be made without departing from the invention in its broader aspects. For example, UV and IV cutoff filters may be used in conjunction with eyepiece lens 22 to provide safety considerations for the user of the apparatus.

Additonally, a second switch, such as a momentary switch could be disposed between point 202 of FIG. 2 and the measurement devices so that the iniation of the measurement device can be controlled independent of the initiation of the light source. Therefore, the appended claims are intended to cover all such changes and modifications that fall within the true spirit and scope of the invention.

The invention is claimed in accordance with the following:

1. An apparatus for facilitating the measurement of light intensity when using a digital photometer or similar device having readout incorporating memory, comprising:
   first means for providing a visually observable optical image of a scene;
   second means for sensing the light intensities within a small acceptance angle of a selected portion of said scene operatively associated with said first means and for providing a visually observable indication of said selected portion; and
   third means operatively associated with both said first and said second means for simultaneously providing said sensed light intensities as an output signal for use by the digital photometer readout and for modifying the visually observable indication of said selected portion for indicating a memory mode of the digital photometer.

2. The apparatus according to claim 1 wherein said first means defines an optical viewing system including a pentaroof prism for observing said scene in a normal manner.

3. The apparatus according to claim 1 wherein said second means includes an additional optical means for collecting the light of said selected portion and a photoelectric means for converting the light into an equivalent electron flow.

4. The apparatus according to claim 1 wherein said third means includes a light source serially connected to a switch and coupled to the digital photometer for initiating a measurement mode.

* * * * *

UNITED STATES PATENT AND TRADEMARK OFFICE
CERTIFICATE OF CORRECTION

PATENT NO. : 4,030,838
DATED : June 21, 1977
INVENTOR(S) : JON LEROY FESSLER

It is certified that error appears in the above-identified patent and that said Letters Patent are hereby corrected as shown below:

Column 1, line 18, "ascene" should be --a scene--.
Column 1, line 46, "incorporate a memory of" should be --incorporates a memory or--.
Column 1, lines 55 & 56, "exhausting in order that" should be --exhausting nor limiting of the invention but is given for purposes of illustration in order that--.
Column 2, line 14, "scene, system" should be --scene, such system--.
Column 3, line 53, "visable" should be --visible--.
Column 4, line 3, "illustrated" should be --illuminated--.
Column 4, line 30, "develped" should be --developed--.
Column 4, line 61, "iniation" should be --initiation--.

Signed and Sealed this

Tenth Day of January 1978

[SEAL]

Attest:

RUTH C. MASON
*Attesting Officer*

LUTRELLE F. PARKER
*Acting Commissioner of Patents and Trademarks*